(12) United States Patent
Mestach et al.

(10) Patent No.: US 8,288,468 B2
(45) Date of Patent: Oct. 16, 2012

(54) AQUEOUS HYBRID DISPERSIONS

(75) Inventors: Dirk Emiel Paula Mestach, Nijlen (BE); Wicenty Lambertus Stanislaw Pilaszek, Tholen (NL)

(73) Assignee: Nuplex Resins B.V., Bergen Op Zoom (NL)

( * ) Notice: Subject to any disclaimer, the term of this patent is extended or adjusted under 35 U.S.C. 154(b) by 0 days.

(21) Appl. No.: 13/083,622

(22) Filed: Apr. 11, 2011

(65) Prior Publication Data

US 2012/0088878 A1   Apr. 12, 2012

Related U.S. Application Data

(63) Continuation of application No. PCT/EP2009/063219, filed on Oct. 9, 2010.

(60) Provisional application No. 61/103,937, filed on Oct. 9, 2008.

(51) Int. Cl.
*C08L 33/12* (2006.01)
*C09D 11/00* (2006.01)
*C09D 133/12* (2006.01)
*C09J 133/12* (2006.01)

(52) U.S. Cl. .............. 524/457; 526/86; 526/89

(58) Field of Classification Search .......... 524/457; 526/86, 89
See application file for complete search history.

(56) References Cited

U.S. PATENT DOCUMENTS

| | | | |
|---|---|---|---|
| 3,620,989 A | 11/1971 | Cummings | |
| 3,847,851 A | 11/1974 | Tugukumi | |
| 3,919,145 A | 11/1975 | Eckhoff | |
| 4,108,811 A | 8/1978 | Eckhoff | |
| 6,001,922 A | 12/1999 | Clark | |
| 6,369,135 B1 * | 4/2002 | Schork et al. | 523/500 |
| 6,462,127 B1 | 10/2002 | Ingrisch | |
| 6,627,700 B1 | 9/2003 | Kadambande | |
| 6,759,472 B2 * | 7/2004 | Overbeek et al. | 524/500 |

FOREIGN PATENT DOCUMENTS

| | | | |
|---|---|---|---|
| CN | 1473863 A | | 2/2004 |
| JP | 61266474 A | | 11/1986 |
| JP | 62010170 A | | 1/1987 |
| KR | 20040103041 A | | 12/2004 |
| WO | 9502019 A2 | | 1/1995 |
| WO | WO 9502019 A2 | * | 1/1995 |
| WO | 9726303 A1 | | 7/1997 |
| WO | 9907799 A1 | | 2/1999 |
| WO | 0228977 A2 | | 4/2002 |
| WO | 2007131959 A1 | | 11/2007 |

OTHER PUBLICATIONS

T. Nabuurs and A. German, Progress in Organic Coatings, vol. 27, pp. 163-172 (1996).
T. Nabuurs, Alkyd-acrylic composite emulsions: polymerization and morphology (doctoral thesis) Technische Universiteit Eindhoven, 1997, ISBN 90-386-0978-7.
J.M. Asua, Mini-emulsion Polymerization, Prog. Polym. Sci. 27, 1283 (2002).
I. Capek and C. S. Chern, Radical Polymerization in Direct Mini-Emulsion Systems, Advances in Polymer Science, vol. 155 (2001).

* cited by examiner

*Primary Examiner* — Kelechi Egwim
(74) *Attorney, Agent, or Firm* — Coraline J. Haitjema; David P. Owen; Hoyng Monegier LLP

(57) ABSTRACT

The invention relates to a process for the preparation of an aqueous hybrid polymer dispersion comprising an auto-oxidatively crosslinkable polymer and an addition polymer. The invention further relates to the aqueous hybrid polymer dispersion obtainable by said process, the use thereof for the manufacture of coating compositions, ink compositions or adhesives and to coating compositions includes the hybrid polymer dispersion as a binder. The process includes a first polymerization step wherein a first hybrid polymer dispersion is formed by addition polymerization of vinyl monomers in the presence of dispersed auto-oxidatively crosslinkable polymer and a second polymerization step wherein secondary polymerization loci are provided in the first hybrid polymer dispersion to polymerise residual vinyl monomer of the first polymerisation step. The aqueous hybrid polymer dispersions have very low residual vinyl monomer content by achieving a high if not full conversion of the vinyl monomers at the end of the polymerization.

18 Claims, No Drawings

US 8,288,468 B2

AQUEOUS HYBRID DISPERSIONS

CROSS REFERENCE TO RELATED APPLICATIONS

This application is a continuation of PCT/EP2009/063219, filed on Oct. 9, 2009, which claims priority from U.S. provisional application No. 61/103,937 filed on Oct. 9, 2008. Both applications are incorporated by reference in their entireties.

FIELD OF THE INVENTION

The invention relates to a process for the preparation of an aqueous hybrid polymer dispersion comprising an auto-oxidatively crosslinkable polymer and an addition polymer. The invention further relates to the aqueous hybrid polymer dispersion obtainable by said process, the use thereof for the manufacture of coating compositions, ink compositions or adhesives and to coating compositions comprising the hybrid polymer dispersion as a binder. The aqueous hybrid polymer dispersions have very low residual vinyl monomer content by achieving a high if not full conversion of the vinyl monomers at the end of the polymerization.

Auto-oxidatively crosslinkable polymers are polymers that crosslink on exposure to oxygen, for example when drying in air. These polymers generally contain unsaturated moieties that have allylic hydrogen; these materials are converted to hydroperoxides by auto-oxidation. These hydroperoxides can form free radicals that initiate a polymerization reaction that leads to the crosslinking of the polymer. Auto-oxidatively crosslinkable polymers are also referred to as auto-oxidatively drying polymers.

In the context of this invention a hybrid polymer is a polymer formed by addition polymerisation of vinyl monomers in the presence of an auto-oxidatively crosslinkable polymer. A hybrid polymer has, compared to a blend of corresponding composition, the advantage of improved storage stability of the dispersion, a reduced tendency to phase segregate upon film-formation and accordingly better coating properties.

BACKGROUND OF THE INVENTION

Many attempts have been made to prepare hybrid polymer dispersions, in particular alkyd-acrylic hybrid polymer dispersions, aiming to achieve an ideal balance of the best properties of each of the polymers combined in the hybrid polymer. Alkyd emulsions and acrylic dispersions, made by means of emulsion polymerization, are the two most common waterborne technologies used in the coating industry. Coatings based on alkyd emulsions exhibit advantages over those based on acrylic dispersions in terms of gloss, brush-ability, open time, flow and levelling, hiding per coat, mar resistance, sand-ability, and adhesion. Advantages of acrylic dispersions over alkyd emulsions include quick drying, durability, non-yellowing, non-embrittling, and non-chalking (pigment release by degradation of the binder).

In addition to the advantages described above for alkyds, coatings based on alkyd-modified hybrid dispersions have improved film forming properties due to the presence of alkyd moieties, which typically have a low glass transition temperature (Tg). However, the presence of the alkyd also results in critical problems, such as soft films (causing dirt pick-up and poor block resistance), high residual vinyl monomer content and yellowing. High residual monomer content is a threat to the environment and health and is strictly regulated. Furthermore, during the addition polymerisation, unsaturated groups on the alkyd are lost, resulting in the deterioration of the auto-oxidation properties of the alkyd. The known hybrids also have an undesirably low open time, defined as the period of time during which corrections can be made in the wet paint film without leaving brush marks.

PRIOR ART

From U.S. Pat. Nos. 3,919,145, 4,108,811 and WO9726303, it is known to blend oxidatively drying polymers with acrylic polymer dispersions to reduce yellowing and in some cases cost. However the performance of the resulting coatings, in particular the mechanical properties and the resistance to chemicals is greatly reduced. U.S. Pat. No. 6,001,922 discloses a blend of polyester/acrylic hybrid latexes with an alkyd.

T. Nabuurs and A. German, Progress in Organic Coatings, Vol. 27, pages 163-172 (1996), discuss that a mixture of alkyd and vinyl polymers can exist as a blend of a vinyl polymer dispersion and an alkyd dispersion, however although the dispersions are blended, the alkyd and vinyl polymers still exist in distinct particles or phases causing application problems like a lower gloss. This prompted development of hybrid alkyd-acryl dispersions wherein two distinct polymers are present in one particle. (see also "Alkyd-acrylic composite emulsions: polymerization and morphology", Tijs Nabuurs, doctoral thesis, Technische Universiteit Eindhoven, 1997, *ISBN* 90-386-0978-7).

U.S. Pat. No. 6,369,135 describes a hybrid graft copolymer made by dissolving an alkyd resin in various vinyl monomers (methyl methacrylate, styrene, etc.). The monomer/alkyd solution is then mini-emulsion polymerized to form a latex consisting of submicron particles of polymer with the alkyd grafted onto the polymer backbone. The mini-emulsion process is described in the following publications: J. M. ASUA. "Mini-emulsion Polymerization". Prog. Polym. Sci. 27, 1283 (2002) and I. Capek and C. S. Chem, "Radical Polymerization in Direct Mini-Emulsion Systems", Advances in Polymer Science, Vol. 155 (2001). The disadvantage of this process is the high residual monomer content.

WO0228977 describes an aqueous dispersion comprising an alkyd a vinylpolymer I, a vinylpolymer II and a liquid medium; wherein said vinyl polymer I is pre-formed prior to incorporation into the aqueous dispersion and wherein said vinyl polymer II is prepared in the presence of the alkyd and the vinylpolymer I. These aqueous dispersions are claimed not to suffer from impaired auto-oxidation properties of the alkyd. This process will not result in the formation of a true hybrid polymer with the disadvantages as described above WO9502019 discloses hybrid emulsions comprising an air-drying alkyd resin, combined with an acrylic resin, dispersed in water. The hybrid emulsions are prepared by first mixing an alkyd emulsion with an acrylic monomer to yield a pre-emulsion. The pre-emulsion is then further emulsified in water in high-pressure emulsifying equipment. The resulting pre-emulsion of the alkyd/acrylic mixture is then heated to 80° C., and an initiator added for a batch emulsion polymerization process. The process of this patent reaches a low limiting conversion resulting in an aqueous dispersion having a high level of residual monomers that is not fit for use in coatings.

U.S. Pat. No. 3,620,989 describes a process for preparing an aqueous dispersion of multi-polymer particles wherein the individual particles comprise both alkyd resin and addition polymer. The alkyd resin having ethylenic unsaturation in the polymeric backbone and the vinyl monomer are emulsified and copolymerized. This polymerization has, however, a relatively poor conversion rate. The examples show a percentage yield of polymer of 85% maximum which means that the compositions contain a high proportion of free monomer. Such a proportion is unacceptable from both toxicological and customer acceptance points of view.

The removal of residual monomer from the dispersion in a separate monomer removal step, for example by distillation under reduced pressure or by steam stripping, is possible but not desirable because such removal is an expensive process step, is a loss of valuable monomers, cannot remove all monomer, may deteriorate the stability and quality of the polymer dispersion and deteriorate final coating properties like gloss.

Thus, there remains a need for a process for preparing aqueous hybrid polymer dispersions, in particular alkyd-acrylic dispersions, that have low residual monomer content without separate monomer removal step, have a good dispersion stability, improved open time and that are capable of drying to a hard, tack-free film showing less yellowing. The object of the invention therefore is to provide a process that has one or more of the above advantages.

According to the invention there is provided a process for the preparation of an aqueous hybrid polymer dispersion comprising a hybrid polymer of an auto-oxidatively crosslinkable polymer and an addition polymer, wherein in a first polymerization step a first hybrid polymer dispersion is formed by addition polymerization of vinyl monomers in the presence of aqueously dispersed auto-oxidatively crosslinkable polymer, characterized in that, in a second polymerization step secondary polymerization loci are provided in the first hybrid polymer dispersion to polymerise residual vinyl monomer of the first polymerisation step. In a particularly preferred embodiment the first polymerization step is a mini-emulsion polymerisation.

The process according to the invention is solvent free, or at least substantially solvent free. Solvent-free for the purposes of this application means substantially no organic solvent, and where the volatile organic compound (VOC) amount is less than about 25 g/l. The VOC for these purposes means any organic compound having an initial boiling point of less than or equal to 250° C. measured at a standard pressure of 101.3 kPa.

The invention solves the conversion problem and results in a hybrid polymer dispersion with a very low residual monomer content. No preformed polymer, next to the alkyd resin has to be pre-charged. Without wishing to be bound by theory, the inventors believe that the high residual vinyl monomer content is a result of incomplete conversion of the vinyl monomers due to the presence of the unsaturated groups of the auto-oxidatively crosslinkable polymer in the primary hybrid polymer particles. These unsaturated groups may impair conversion of vinyl monomer to vinyl polymer such that the polymerisation reaches the limiting conversion at conversion levels significantly below 100%. The limiting conversion is the conversion beyond which the polymerisation stops and the residual monomer amount does no longer decrease. This effect becomes more pronounced as the level of unsaturation in the alkyd increases. By providing the secondary polymerisation loci in the first dispersion, the residual monomer present in the primary particles will transport through the aqueous phase into the secondary polymerisation loci and will form a secondary population of polyvinyl non-hybrid particles.

DETAILED DESCRIPTION

The preferred process according to the invention comprises a first polymerization step comprising the steps of: a) providing a mixture of i) an aqueous dispersion of 10 to 90 wt % of an auto-oxidatively crosslinkable polymer (wt % relative to total polymer weight), ii) 90 to 10 wt % vinyl monomers and iii) 1 to 15 wt % surfactant (wt % of surfactant relative to the total of polymers and surfactant). It is noted that the surfactant can be added as a separate component, but can also be formed in situ from vinyl monomers and a suitable initiator, as described in detail below. The above described process hence implies providing 1-15 wt % surfactant either by addition of surfactant and/or by the in-situ formation of surfactant from vinyl monomer and an initiator. Surfactants of the reactive type become part of the polymer during the addition polymerisation. Preferably, the amount of auto-oxidatively crosslinkable polymer is 30 to 70 wt % and more preferably 40 to 60 wt %. In step b) the mixture is converted to a mini-emulsion as described in detail below. The radical initiator can be added (step c) to the mixture of step a) or can be added before, during or after the mini-emulsion polymerisation step b). In step d) the vinyl polymers are polymerised by starting the radical generation, preferably by raising the temperature, to form a first hybrid polymer dispersion. The polymerisation is preferably continued until reaching the limiting conversion. The first polymerisation step is followed by a second addition polymerization step comprising the steps of a) providing secondary polymerization loci in the first hybrid polymer dispersion and b) polymerising residual vinyl monomer of the first polymerisation step.

A: Auto-Oxidatively Crosslinkable Polymers

As described above, the auto-oxidatively crosslinkable polymer generally contain unsaturated moieties that have allylic hydrogen. Preferably, the polymers contains unsaturated fatty acid residues which undergo crosslinking by auto-oxidation. The unsaturated fatty acid can be derived from linseed, sunflower seed, tobacco seed, soya bean, dehydrated castor, marine animal and tung oils. The unsaturation in polymers from such groups imparts latent crosslinability so that when a coating composition thereof is dried in air (often in conjunction with a drier salt) the composition undergoes crosslinking, thereby improving its properties such as mechanical properties (improved hardness and durability) and chemical resistance. A further advantage of coatings containing unsaturated fatty acid residues is an improved glossy appearance.

Alkyd resins are a common and preferred class of polymers that dry by auto-oxidation. Alkyds are typically manufactured from unsaturated fatty acid residue containing esters which are prepared from the reaction of a polyhydric alcohol, a polybasic acid and a drying oil. Alkyd resins are well known in the art. General processes for preparing alkyds are disclosed in U.S. Pat. No. 4,108,811 and in "Alkyd Resin Technology", T C Patton, 1962, Publisher John Wiley & Sons Inc. Preferably, the alkyd resin is hydrophobic in that the resin includes acid groups that are carboxyl groups and have an acid value that is not higher than about 25 mg KOH/g. Further, the acid value of the alkyd may be very low, even close to zero. If the acid values become too high, the alkyd will not act as a hydrophobe in forming the mini-emulsion. In another embodiment, the alkyd resin may comprise acid groups derived from sulphur and/or phosphorous.

Another class of oxidatively crosslinkable polymers are uralkyds that may be prepared by reacting alkyds having isocyanate-reactive groups, preferably hydroxyl groups, with polyisocyanates and optionally other components having isocyanate-reactive groups.

Another class of polymers that can crosslink through auto-oxidation are the reaction products of epoxy resins, preferably produced from the reaction between epichlorohydrin and bisphenol-A, with fatty acids. Epoxy resins are commercially available under the trade-name Epikote™ and Epon™ (Hexion Specialty Chemicals) or Dow Epoxy Resin™ (Dow Chemical).

A special group of resins that dry by auto-oxidation are resins containing hydroxyl terminated polybutadienes. The hydroxyl groups of these polybutadienes, primarily, allylic, exhibit good reactivity in condensation or polyaddition reactions. Hydroxyl-terminated polybutadienes are commercially available from Elf Atochem under the trade name PolyBd®.

Yet another group of resins that dry by auto-oxidation are polymers having pendant allyl-groups. Pendant allyl groups can be incorporated for example by using the partial allyl ether of pentaerythritol or trimethylol propane in a polycondensation reaction.

Most preferably, the auto-oxidatively drying polymer is an alkyd having unsaturated fatty acids. Preferably these alkyds are high solids or solvent-free and have a molecular weight that allows the solution of the alkyd in the vinyl monomers to be easily emulsified. Solvent-free means substantially no organic solvent, and where the volatile organic compound (VOC) amount is less than about 25 g/l. The VOC for these purposes means any organic compound having an initial boiling point less than or equal to 250° C. measured at a standard pressure of 101.3 kPa. Preferred types are long oil and medium oil alkyds. These alkyds have an oil length of about 20-90%, where the oil length is the percent of oil (or fatty acid) calculated as triglyceride, being used in the synthesis of the alkyd. Commercially available alkyds that can be used in this invention are available for example under the trade names Setal 293 XX-99, Setal 249 XX-99 and Setal 254 from Nuplex Resins.

B. Addition Polymers.

Vinyl monomers are added to the auto-oxidative crosslinkable polymer dispersion and polymerised in the presence thereof by free radical addition polymerisation to form addition polymers (also referred to as vinyl polymers).

Addition polymers that can be prepared by free radical polymerization include homo or copolymers derived from one or more olefinically unsaturated monomer(s). Examples of olefinically unsaturated monomer(s) which may be used to form the addition polymer include but are not limited to 1,3-butadiene, isoprene, styrene, α-methyl styrene, divinyl benzene, indene, acrylonitrile, methacrylonitrile, vinyl halides such as vinyl chloride, vinyl esters such as vinyl acetate, vinyl propionate, vinyl laurate, and vinyl esters of versatic acid such as VeoVa 9 and VeoVa 10 (VeoVa is a trademark of Hexion Specialty Chemicals), heterocyclic vinyl compounds, alkyl esters of mono-olefinically unsaturated dicarboxylic acids (such as di-n-butyl maleate and di-n-butyl fumarate) and, in particular, esters of acrylic acid and methacrylic acid of formula $CH_2=CR^2-COOR^3$ wherein $R^2$ is H or methyl and $R^3$ is optionally substituted alkyl or cycloalkyl of 1 to 20 carbon atoms (more preferably 1 to 8 carbon atoms) examples of which are methyl acrylate, methyl methacrylate, ethyl acrylate, ethyl methacrylate, trifluorethyl (meth)acrylate, n-butyl acrylate, n-butyl methacrylate, 2-ethylhexyl acrylate, 2-ethylhexyl methacrylate, isopropyl acrylate, isopropyl methacrylate, n-propyl acrylate, n-propyl methacrylate, and hydroxyalkyl (meth)acrylates such as 2-hydroxyethyl acrylate, 2-hydroxyethyl methacrylate, 2-hydroxypropyl methacrylate, 2-hydroxypropyl acrylate, 4-hydroxybutyl acrylate, 4-hydroxybutyl methacrylate and their modified analogues like Tone M-100 (Tone is a trademark of Dow Chemical). Olefinically unsaturated monocarboxylic and/or dicarboxylic acids, such as acrylic acid, methacrylic acid, fumaric acid, and itaconic acid are other examples that can be used. Other olefinically unsaturated monomers that can be used are those monomers that contain a fatty acid derived estergroup such as oleyl(meth)acrylate, linoleyl (meth)acrylate, and linolenyl(meth)acrylate, synthesis of these monomers is described in J. Appl. Poly. Sci., 30, 4571-4582 (1985), the analogue vinyl esters or monomers derived from the addition reaction between glycidyl (meth)acrylate and a fatty acid such as mentioned in British patent application GB 2237276. These monomers provide auto-oxidative drying properties also to the vinyl polymer part of the hybrid polymer. Other monomers that can be used comprise the vinyloxazoline diesters of unsaturated fatty acids like such as Dapro FX 521 commercially available from Elementis Specialities. In view of achieving good properties in the most preferred application in coatings, the particularly preferred addition polymers are styrene and/or acrylic polymers (i.e. based predominantly on styrene and/or at least one ester of acrylic or methacrylic acid). The monomers may also be crosslinkable such as to form a 2K system, where the crosslinking agent is added separately.

C. Mini-Emulsion Polymerization.

Although mini-emulsion polymerisation is the most preferred process for reasons explained below, in principle, the advantages of the process according to the invention can be achieved to some extent also in ordinary emulsion polymerisation processes.

In emulsion polymerization the monomer is present in emulsified monomer droplets, but polymerisation takes place in micelles formed by the surfactant. Monomer diffuses from the droplets to the growing polymer particles. Contrary to what is happening in emulsion polymerization, in mini-emulsion polymerization all (or at least a large fraction) of the monomer droplets are nucleated and no micelles are present as all surfactant is used to stabilize the droplets consisting of a solution of alkyd in vinyl monomers. Prevalent droplet nucleation can only occur if the surface area of the monomer droplets is large compared with that of the micelles. This requires monomer droplets that are in the sub-micron range. These small droplet size oil-in-water dispersions are referred to as Mini-emulsions. A comprehensive review on mini-emulsion polymerization has been published by J. M. Asua, Prog. Polym. Sci. 27 (2002) 1283-1346. The advantage of mini-emulsion polymerisation over ordinary emulsion polymerisation processes is that it achieves more uniform distribution of alkyd and vinyl polymer over the hybrid particles, possibly a higher solids content and a better control of the particle size distribution, resulting in better properties in application of the hybrid polymer for example in coatings.

Mini-emulsions are composed of water, a monomer phase, and one or more surface-active substances and have a droplet size of from 50 to 500 nm Mini-emulsions are considered to be meta-stable systems and degrade over time by molecular diffusion (Oswald ripening effect). Mini-emulsions can be stabilized against Ostwald ripening by the inclusion of a water-insoluble compound referred to as a hydrophobe (also referred to as co-stabiliser). The surfactant system is dissolved in water; the hydrophobe is dissolved in the monomers and mixed under stirring. Then, the mixture is subjected to high efficient homogenization. This can be accomplished by passing a course macro-emulsion through a high pressure homogenizer. In high pressure homogenizers, the fine division of the components is achieved by means of a high local energy input. In the process according to the invention the auto-oxidative polymer and/or the vinyl monomers can be hydrophobic and function as the hydrophobe, so less or no additional hydrophobe co-stabiliser is required to prevent Oswald ripening. Suitable hydrophobic vinyl monomers are lauryl or stearyl methacrylate or chain transfer agents such as alpha-methyl styrene dimer.

In a first mini-emulsion technique the aqueous macro-emulsion is compressed to more than 1000 bar by means of a piston pump, for example, and is then released through a narrow slot. The effect here is based on interplay of high shear gradients and pressure gradients and cavitation in the slot. An example of such a homogenizer is the Manton-Gaulin high pressure homogenizer as described in GB190322875. This equipment is commercially available from Invensys as the APV-1000 and APV-2000.

In a second type of homogenizer the compressed aqueous macro-emulsion is released into a mixing chamber through two nozzles directed against one another. In this case the fine distribution effect is dependent in particular on the hydrodynamic conditions prevailing within the mixing chamber. One example of this type of homogenizer is the Microfluidizer type M 120 E from Microfluidics Corp. In this high-pressure homogenizer the aqueous macro-emulsion is compressed to pressures of up to 1200 bar by a pneumatically operated piston pump and is released via what is called an "interaction chamber". Within the "interaction chamber" the emulsion jet is divided, in a micro-channel system, into two jets which are collided at an angle of 180°. High shear rotor-stator systems such as the Ultraturax homogenizer (IKA) can also be used, but is generally less effective in reducing the droplet size of the mini-emulsion.

Another route, although not really preferred from a large-scale production perspective, is to prepare mini-emulsions is by the use of ultrasound. The fine distribution here is based on cavitation mechanisms.

Once a stable mini-emulsion is obtained it can be polymerized by the free-radical initiation system. The initiator can be added before during or after homogenization. The initiator can be started to provide free radicals for the addition polymerisation by raising the temperature, by chemical reaction with a starter, for example by a redox reaction, or by radiation, for example UV-radiation. Suitable initiators include inorganic peroxides such as potassium, sodium or ammonium persulphate, hydrogen peroxide, or percarbonates; organic peroxides, such as acyl-peroxides including benzoyl peroxide and alkyl hydroperoxides such as t-butyl hydroperoxide and cumene hydroperoxide; dialkyl peroxides such as di-t-butyl peroxide; peroxy esters such as t-butyl perbenzoate and the like; mixtures may also be used. The peroxy compounds are in some cases advantageously used in combination with suitable reducing agents (redox systems) such as sodium or potassium pyrosulphite or bisulphate, sodium formaldehyde sulphoxylate and iso-ascorbic acid. Azo compounds such as 2,2'-azobisisobutyro nitrile, 2,2'-azobis-2-methyl butyronitrile, 2,2'-azobis(2,4-dimethyl pentane nitrile), 2,2'-azobis(2-methyl propane nitrile), 2,2'-azobis(2-methyl butane nitrile), 1,1'-azo(cyclohexane carbonitrile) and 4,4'-azobis(4-cyanopentanoic) acid may also be used. Metal compounds such as Fe.EDTA (EDTA is ethylene diamine tetracetic acid) may also be usefully employed as part of the redox initiator system. The amount of initiator or initiator system to use is conventional, for example within the range of 0.05 to 6 wt % based on the weight of the olefinically unsaturated monomer(s) used.

D. Secondary Polymerisation Loci

The secondary polymerisation are preferably added after at least 75%, preferably at least 85%, more preferably at least 90% and most preferably at least 95% conversion of the vinyl monomers in the first polymerisation step. Most preferably, the loci are added after reaching the limiting conversion in the mini-emulsion system. The advantage is that a lower amount of secondary particles is formed and by consequence less problems can arise relating to phase segregation and dispersion instability. The second polymerisation step can in principle also be started during the first polymerisation step, i.e. before reaching said limiting conversion, for example in view of reducing the total reaction time. The amount of secondary polymerisation loci is chosen in view of the amount of residual monomer present after the first polymerisation step and in view of the desired monomer content after the second polymerisation step. Additional amounts of monomer may be present at the secondary polymerisation loci. There should, however, be substantially no first hybrid polymer present at the secondary polymerisation loci, as the first hybrid polymer would inhibit secondary polymerisation.

Several ways exist to start secondary nucleation in a polymerization system. An extensive overview of all possible particle formation mechanisms is given by F. K. Hansen and J. Ugelstad in "EMULSION POLYMERIZATION" ed. Irja Piirma, Academic Press, p 51-92 (1982). The most commonly used method to obtain secondary nucleation is the addition of additional surfactant to the polymerizing system to create new empty micelles as secondary polymerisation loci. The amount of additional surfactant should be sufficient to bring the concentration above the critical micelle concentration as can be determined by monitoring the surface tension of the polymer dispersion. Addition of additional initiator will nucleate the micelles and residual monomer from the first polymerisation step will migrate from the primary polymer particles to the newly formed micelles forming a new population of secondary non-hybrid polyvinyl polymer particles.

Suitable surfactants are ionic or non-ionic surfactants. Examples of anionic emulsifiers are: potassium laurate, potassium stearate, potassium oleate, sodium decyl sulphate, sodium dodecyl sulphate, and sodium rosinate. Examples of non-ionic emulsifiers are: linear and branched alkyl and alkylaryl polyethylene glycol ethers and thioethers and linear and branched alkyl and alkylaryl polypropylene glycol ethers and thioethers, alkylphenoxypoly(ethylenoxy)ethanols such as the adduct of 1 mole of nonylphenol to 5-50 moles of ethylene oxide, or the alkali salt or ammonium salt of the sulphate or the phosphate of said adduct.

Also surfactants containing an olefinicaly unsaturated group that can participate in a free radical polymerization can be used. Suitable polymerizable surfactants include hemi-esters of maleic anhydride of the formula M+.—OOC—CH=CHCOOR wherein R is C(6-22) alkyl and M+ is Na+, K+, Li+, NH4+, or a protonated or quaternary amine Polyoxyethylene alkylphenyl ethers with an ethylenically unsaturated bond sold under the tradename Noigen® RN (ex Montello, Inc.) such as NOIGEN RN-10™, NOIGEN RN-20, NOIGEN RN-30, NOIGEN RN-40™, and NOIGEN RN-5065™ or the sulphate thereof sold under the tradename Hitenol® BC (ex Montello, Inc.) such as HITENOL BC-10™, HITENOL BC-1025™, HITENOL BC-20™, HITENOL BC-2020™, HITENOL BC-30™. MAXEMUL™ 6106 (available from Uniquema), which has both phosphonate ester and ethoxy hydrophilicity, a nominal $C_{18}$ alkyl chain with an acrylate reactive group. Other representative reactive surfactants with phosphate ester functionalities suitable for such reactions include, but are not limited to, MAXEMUL™ 6112, MAXEMUL™ 5011, MAXEMUL™ 5010 (all available from Croda Industrial Specialties). Alternative reactive surfactants suitable for use with various embodiments of the present invention include sodium allyloxy hydroxypropyl sulphonate (available from Rhodia as SIPOMER COPS-1™), ADEKA REASOAP SR/ER series such as ADEKA REASOAP ER-10, ER-20, ER-30 and ER-40, Akeda Reasope SR-10, SR-20, SR-30 (all available from Asahi Denka Co., Ltd.) and allylsulphosuccinate derivatives (such as TREM LT-40™ (available from Henkel)). Polymeric surfactants or surface active oligomers can also be used provided they form micelles when added to the hybrid dispersion. Most of the time these oligomers are characterized by relatively high acid values (e.g. 200 mg KOH/g). Most frequently additional low molecular weight surfactants have to be used for control of particle size/number. Useful acrylic polymers are commercially available under the trade name "JONCRYL" from BASF. Examples are JONCRYL 67, JONCRYL 586, JONCRYL 611, JONCRYL 678, JONCRYL 680, JONCRYL 682, JONCRYL 683, JONCRYL 690, and JONCRYL 693 which are styrene acrylic resins having 98% non-volatile and 2% by weight volatile organic compounds, and are available in the form of clear flakes. Other commercially available polymers include CRAYMUL 8450, CRAYMUL 8460 from Cook Composites and Polymers. Polymeric surfactants comprising ethylenic unsaturated groups polymerizable in addition polymerization can also be used. Examples for the preparation of such polymers can be found for example in patent application WO 03/040192.

Alternatively, surfactants can be generated in situ by adding a small amount of an ethylenically unsaturated monomer, preferably styrene, preferably at a concentration where the monomer is soluble in the aqueous phase at the temperature of the polymerization, and a water soluble initiator generating water-soluble radicals such as alkali persulphates. The radicals will react with the monomer dissolved in the aqueous phase to generate water-soluble oligomers. When these oligomers reach a certain critical degree of polymerization they will become surface active and will form micelles when the amount exceeds the critical micelle concentration.

Suitable initiators for the secondary polymerisation loci are described above for the primary polymerisation step. Preferably, the initiator is water soluble such that the initiator will be present and act substantially only in the secondary polymerisation loci and not in the primary particles. Ideally, the initiator are ionizable (e.g. persulphates) to form in-situ surface active compounds, or have a non-ionic stabilizing group, for example Polyethyleneglycol (PEG) or monomethoxy-PEG.

Another mechanism to form secondary polymerisation loci is self precipitation, wherein on addition of initiator and additional monomers, for example styrene, oligomers are formed that have a limited aqueous solubility and will self-precipitate. The water soluble initiator yields a water-soluble radical, for example a persulphate, which will propagate in the aqueous phase to react with the additional monomer and start polymerisation forming an oligomer that will self-precipitate once a critical polymerization degree is reached and will form the secondary population of particles. The oligomer may also be an in-situ surfactant as described above, but the amount is below the critical micelle concentration, so the oligomer does not form micelles, but will self-precipitate.

A further but not preferred way is the addition of an active polymer dispersion having a small particle size to the miniemulsion polymerization system, however, this system should not include the first polymer.

It is possible to add additional second vinyl monomers to modify and/or grow the secondary particles. These can be chosen in view of improving the reactivity of the monomers in the second polymerisation step, in view of achieving desired properties of the secondary polymer like crosslinkable functionality such as monomers comprising auto-oxidative drying functional groups, ketone functional monomers or activated methylene functional monomers. However, in view of maintaining the advantages of the hybrid polymer as described above, the total amount of the secondary non-hybrid polyvinyl particles is preferably low, preferably the total amount of vinyl polymer formed in the secondary particles is preferably less than 20, more preferably less than 15, even more preferably less than 10 and most preferably less than 5 wt % (relative to the total weight of the vinyl monomers).

The dispersion contains at least 75 wt. %, more preferably at least 80 wt. % even more preferably at least 90 wt. % and most preferably at least 95 wt. % of the primary hybrid polymer particles (relative to the total polymer weight in the dispersion). After the secondary polymerisation process the residual monomer concentration is reduced to below 1.0 wt. %, preferably below 0.75 wt. %, more preferably below 0.5 wt. %, even more preferably below 0.25 wt. % and most preferably even below 0.20 wt. %. Preferably, apart from the usual known additives required for the envisaged application as described below, no other polymers are present than the hybrid polymer and the addition polymer in the primary and secondary particles according to the invention.

The invention also relates to the aqueous hybrid polymer dispersion obtainable by the process according to the invention comprising two populations of particles wherein a first population of particles comprises a hybrid polymer comprising an auto-oxidatively crosslinkable polymer and an addition polymer and a second population of particles comprises a second addition polymer, which dispersion preferably has a low residual monomer concentration below 1.0 wt. %, preferably below 0.75 wt. %, more preferably below 0.5 wt. % even more preferably below 0.25 wt. % and most preferably even below 0.20 wt. %. The second population of non-hybrid polymer particles constitutes only a small part of the total product and the particle size of the secondary particles is small. The secondary particles can easily be distinguished from the primary particles on the basis of difference in size, amount and/or composition by transmission or scanning electron microscopy. Differences in composition can be visualised by staining, for example with Osmium-tetroxide.

The aqueous hybrid polymer dispersions obtainable by the process according to the invention can be advantageously used as an alternative for conventional waterborne alkyd dispersions, acrylic dispersions and alkyd-acrylic hybrids or blends for the manufacture of coating compositions, ink compositions or adhesives. They can compete as an alternative for solvent-borne systems, in particular solvent-borne alkyd binders which are nowadays most frequently used in decorative trim paints and varnishes, metal topcoats and (anti-corrosion) primers, direct to metal coatings. These coatings can be applied by a variety of known methods including brushing, dipping, flow coating, spraying, and the like. The coating compositions may contain other ingredients including coalescing organic solvents, pigments, dyes, emulsifiers, surfactants, thickeners, heat stabilizers, levelling agents, anti-cratering agents, fillers, anti-settling agents, UV absorbers, antioxidants and the like. The hybrid polymer dispersion of the invention can be formulated into coating compositions in combination with other aqueous polymer dispersions or solutions that are not according to the invention.

In particular, the aqueous hybrid polymer dispersions of the invention, and coating compositions made thereof advantageously include a drier or combinations of different driers. Driers are well known to the art for accelerating auto-oxidation. Driers are the salts of metals and long chain carboxylic acids or metal naphthanates. The most important drier metals are cobalt, manganese, zirconium, lead and calcium. The level of drier salt(s) in the composition is typically that to provide an amount of metal(s) within the range of from 0.01 to 0.5% by weight based on the weight of the alkyd. The drier(s) may be incorporated into the composition at any stage of the production of the hybrid polymer dispersion or the coating composition.

The properties of the coating composition and the resulting coating according to the invention depend not only on the properties of the binder, but also on the properties of other components in the coating composition. However, with all other composition features being equal the improved hybrid polymer dispersion of the invention provides significant improvements in open time, gloss retention, tack-free and dust free time.

The present invention is now illustrated by the following non-limiting examples.

General Procedure for the Preparation of Mini-Emulsions.

In a typical process, the oxidatively drying resin is dissolved in a monomer- or monomer/initiator mixture. The monomer-resin solution is then poured into the surfactant solution under shearing with a mechanical stirrer (at 1200 rpm for 30 minutes) to create a macro-emulsion. The obtained coarse premix is further homogenized using a two-stage homogenizer APV-1000 in a continuous process during 10-60 minutes at a total pressure of 900-1000 bar to obtain a mini-emulsion. During this process the product is cooled down by a cooling device, build-in in the continuous loop, to keep the overall temperature of the emulsion low enough to prevent premature undesirable reactions. A minimal amount, of electrolyte is added to the macro-emulsion to reduce the viscosity of the mini-emulsion.

Determination of Open Time.

Open time can be measured by applying the coating onto a Leneta plain chart FORM WH with a bar applicator at 125 microns. Using the rubber eraser of a pencil with a width of at least of 2 mm, X-shaped crosses are being applied into the paint layer immediately after it has been applied. A brush (Elma acryl 93-14) loaded with fresh paint is moved twice in the direction of the width of the substrate and twice in the direction of the length of the substrate at the location of the X-shaped cross. This movement is repeated until the cross has completely disappeared. This procedure is repeated after a two-minute interval until the crosses stay visible even after five movements (one movement=twice in the direction of the width of the substrate and twice in the direction of the length of the substrate). The open time is reported as the time in which the X-cross shape damage in the fresh applied film can be completely reworked after five movements immediately after brushing.

Determination of Residual Monomer Content

The residual monomer content was determined by reversed phase HPLC using a Symmetry-C18, 150×3.9 mm, 5 μm column from Waters and a flow rate of 0.7 ml/min Detection was done by a UV-detector at 210 nm Gradient elution was done using a reservoir A consisting of water+0.1% $H_3PO_4$ and a reservoir B containing acetonitrile+0.1% $H_3PO_4$. The elution gradient depends on the polarity of the monomer to be determined Polar monomers: 100% A to 50% A in 15 min, followed by 50% A to 100% B in 0.1 min, followed by 15 min 100% B linear. For apolar monomers: 100% A to 100% B in 30 min. followed by 15 min. 100% B linear. The sample concentration was 0.1-100 mg/ml. Injected volume is 10 μl. The data was handled with Empower LC-software from Waters). The detection limit is 0.02 wt. %

EXAMPLE 1

337.6 parts by weight of a long oil alkyd resin, commercially available under the trade name Setal™ 293XX-99 (solids content 99%) available from Nuplex Resins BV, is mixed with 168.8 parts by weight of methyl methacrylate and 168.8 parts by weight of n-butyl methacrylate. In this mixture 5.4 parts by weight of azo-bis-methylbutyronitrile is dissolved. The monomer-resin solution is then poured into a solution consisting of 64.3 parts by weight of Dowfax 2A1 (anionic surfactant available from Dow Chemical) and 9.5 parts by weight of sodium hydrogen carbonate (electrolyte) in 716.5 parts by weight of deionized water to prepare a macro emulsion. This coarse emulsion is converted into a mini emulsion, with a droplet size of approximately 100 nanometers, following the method described in the general procedure. The mini-emulsion is transferred to a reactor equipped with a condenser, a thermometer, nitrogen purge, a stirrer and a feed tube. The contents are stirred, heated and maintained at 75° C. for 3 hours to reach limiting conversion (as determined by measurement of residual monomer content by HPLC or by GC). A sample is taken from the reactor and 8.1 parts by weight of styrene are added to the reactor and mixed for 30 minutes to obtain a uniform mixture. Then a solution of 16.3 parts by weight of water soluble initiator sodium persulphate and 146.9 parts by weight of deionized water was added during 2 hours and maintained at temperature for an additional 30 minutes. The dispersion is cooled down and the final product is filtered. Residual monomer content was determined by reversed phase HPLC. The properties of the resulting hybrid polymer dispersion are listed in Table 1.

TABLE 1

| | |
|---|---|
| Solids content according to ISO 3251 | 43.2% |
| pH | 8.04 |
| Viscosity | 17.5 cPa · s (Brookfield) |
| Particle size (Z average mean) | 120 nm |
| Methyl methacrylate | <0.02 wt % |
| n-Butyl methacrylate | 0.19 wt % |
| Styrene | <0.02 wt % |

EXAMPLES 2-6

Examples 2-6 were prepared following the same procedure as for example 1 but using the raw material listed in Table 2.

TABLE 2

| | Example | 2 | 3 | 4 | 5 | 6 | Comp A |
|---|---|---|---|---|---|---|---|
| water-phase | Demineralized water | 716.5 | 716.5 | 716.5 | 716.5 | 716.5 | 716.5 |
| | Sodium hydrogen carbonate | 9.5 | 9.50 | 9.50 | 9.50 | 9.50 | 9.50 |
| | DOWFAX 2A1[1] | 64.30 | 64.30 | 64.30 | | | 64.30 |
| | Disponil FES 993IS[2] | | | | 160.0 | | |
| | Reasoap SR1025[3] | | | | | 160.0 | |

TABLE 2-continued

| | Example | 2 | 3 | 4 | 5 | 6 | Comp A |
|---|---|---|---|---|---|---|---|
| Alkyd | SETAL 293 XX-99 | 337.6 | | | | 337.6 | 337.6 |
| | SETAL 249 XX-99[4] | | 337.6 | 337.6 | | | |
| | SETAL 254[4] | | | | 337.6 | | |
| Vinyl monomer | Methyl methacrylate | 168.8 | 168.8 | 168.8 | 168.8 | 135.1 | 168.8 |
| | n-Butyl acrylate | 168.8 | | | | | |
| | n-Butyl methacrylate | | 168.8 | 168.8 | 168.8 | 135.1 | 168.8 |
| | Glycidyl methacrylate- sunflower fatty acid adduct | | | | | 67.50 | |
| initiator | Azo-bis- methylbutyronitril | 5.40 | 5.40 | 5.40 | 5.40 | 5.40 | 5.40 |
| Second step | Styrene | 8.10 | 8.1 | | 8.1 | 8.1 | — |
| | Reasoap SR1025[3] | | | 88.25 | | | — |
| | Sodium persulphate | 16.32 | 16.32 | 16.32 | 16.32 | 16.32 | — |
| | Demineralized water | 146.9 | 146.9 | 146.9 | 146.9 | 146.9 | — |

[1]anionic surfactant ex Dow Chemicals
[2]anionic surfactant ex Cognis
[3]anionic surfactant ex Adeka
[4]Setal 249 XX-99 and Setal 254 are air drying long oil alkyds available from Nuplex Resins BV The properties and the residual monomer content of the hybrid polymer dispersions are given in Table 3.

TABLE 3

| example | | 2 | 3 | 4 | 5 | 6 | Comp A |
|---|---|---|---|---|---|---|---|
| n-Butyl acrylate | % | <0.02 | n.a. | n.a. | n.a. | n.a. | |
| n-Butyl methacrylate | % | n.a. | 0.102 | 0.200 | 0.106 | 0.202 | 1.86 |
| Methyl methacrylate | % | 0.43 | <0.02 | <0.02 | <0.02 | 0.081 | 0.84 |
| Styrene | % | <0.02 | <0.02 | <0.02 | <0.02 | <0.02 | |
| Solids content according to ISO 3251 | % | 43.1 | 43.8 | 41.15 | 41.77 | 40.9 | |
| pH | | 7.8 | 8.1 | 7.7 | 7.3 | 7.4 | |
| Viscosity Brookfield | cPa·s | 20 | 17.5 | 20 | 24 | 20.0 | |
| Droplet size mini- emulsion (Zave)* | nm | 107 | 112 | 96 | 108 | 113 | |
| Particle size dispersion (Zave)* | nm | 126 | 110 | 89 | 107 | 109 | |

Z average mean as determined by photon correlation spectroscopy (Malvern Zetasizer)

Comparative Experiment A

In Comparative Experiment A, a first aqueous hybrid polymer dispersion is prepared as in Example 3 without however the second polymerisation step. The free monomer content was determined (given in Table 3). With this level of residual monomer it is toxicologically not acceptable to formulate the hybrid polymer dispersion into an architectural paint formulation.

EXAMPLE 8

Coating Evaluation

The hybrid polymer dispersion from example 6 was formulated into a trim enamel coating composition formulation. A pigment dispersion was prepared by mixing the following ingredients with a high speed mixer at 2000-3000 rpm until a Hegmann fineness is obtained smaller than 10 micron:

| | grams |
|---|---|
| Demineralized water | 4.5 |
| Disperbyk 190 (dispersing aid from Byk-Chemie) | 3.4 |
| BYK 028 (defoamer from Byk-Chemie) | 0.12 |
| Ti-pure R 706 (universal rutile titanium dioxide pigment from DuPont) | 25.8 |

The pigment dispersion was combined under stirring at 1000 rpm with 100.0 grams of the hybrid polymer dispersion from example 6. The stirring speed was adjusted to 2500 rpm to add:

| | grams |
|---|---|
| Acrysol RM 2020 (urethane associative thickener from Rohm and Haas) | 7.0 |
| Nuodex WEB Co 6 (drier from Elementis) | 0.21 |
| Nuodex Ca10 (drier from Elementis) | 0.21 |

Stirring was continued for 20 minutes. The paint was applied onto a glass plate with a doctor blade at a wet film thickness of 150 micron and drying was tested by determination of the dust time and the tack time, according to the TNO-method described in TNO circulaire 87, keuringsblad 11, at a temperature of 23° C. and relative humidity of 50%. The dust-free time is the time after application of a coating layer when a flock of fat free cotton dropped on the drying coating layer and after having stayed there for 10 seconds can be blown off without leaving cotton fluffs. The tack-free time is determined by taking a freshly applied coating layer, at regular time intervals dropping on said layer a flock of fat free cotton with a diameter of 1½-2½ cm, placing a weight of 1 kg on said cotton flock for 10 seconds, removing the weight and attempt to blow off the flock of cotton. This is repeated at regular intervals during the drying until such time that the flock of cotton can be blown off without leaving cotton fluffs (the tack-free time). The coating was found to be dust-free after 47 minutes and tack-free after 3 hours and 45 minutes. These are values that compare favourably with those found for solvent borne trim enamels.

Gloss and haze values were measured (according to ASTM D2457, D523) as a function of drying time (at ambient temperature). The results are listed in Table 4. From these figures it is clear that the trim enamel based on the hybrid polymer dispersions according to the invention have excellent gloss stability

TABLE 4

| | Days after application | | | |
|---|---|---|---|---|
| | 3 | 7 | 14 | 28 |
| Haze | 63.6 | 66.0 | 67.9 | 74.4 |
| Gloss @ 20° | 65.7 | 65.4 | 64.5 | 63.0 |
| Gloss @ 60° | 83.6 | 83.1 | 82.7 | 82.3 |
| Gloss @ 85° | 95.7 | 96.1 | 95.2 | 94.6 |

The open time of the trim enamel based on the hybrid polymer dispersion from example 6 was determined (at 23° C. and 50% R.H.) and was found to be 22 minutes. Under the same condition we determined the open time of commercially available waterborne trim enamel Sikkens Rubbol BL Azura available from AkzoNobel (a coating composition based on an aqueous dispersion of an alkyd and a polyurethane resin) and this was found to be only 8 minutes, hence trim enamels based on the hybrid polymer dispersions according to the invention posses superior open time as compared to currently available waterborne trim enamels.

What is claimed is:

1. A process for the preparation of an aqueous hybrid polymer dispersion comprising a hybrid polymer of an auto-oxidatively crosslinkable polymer and an addition polymer, wherein in a first polymerization step a first hybrid polymer dispersion is formed by addition polymerization of vinyl monomers in the presence of dispersed auto-oxidatively crosslinkable polymer, wherein, in a second polymerization step secondary polymerization loci are provided in the first hybrid polymer dispersion to polymerise residual vinyl monomer of the first polymerisation step; wherein the secondary polymerisation loci are provided after at least 75% conversion of the vinyl monomers in the first polymerisation step; and wherein the dispersion comprises two different populations; a first population of particles comprises a hybrid polymer comprising an auto-oxidatively crosslinkable polymer and an addition polymer and a second population of particles comprises a second addition polymer.

2. The process according to claim 1, wherein the first polymerization step is a mini-emulsion polymerisation.

3. The process according to claim 1, wherein the first polymerization step Comprises the steps of:
a. providing a mixture of
i. an aqueous dispersion of 10 to 90 wt % of an auto-oxidatively crosslinkable polymer (wt % relative to total polymer weight)
ii. 90 to 10 wt % vinyl monomers
iii. 1 to 15 wt % surfactant (relative to total polymer and surfactant weight)
b. converting the mixture to a mini-emulsion,
c. adding a radical initiator to the mixture of step a or before, during or after step b,
d. polymerising the vinyl polymers to form a first hybrid polymer dispersion preferably until reaching the limiting conversion;
and the second addition polymerization step comprises the steps of
e. providing secondary polymerization loci in the first hybrid polymer dispersion,
f. polymerise residual vinyl monomer of the first polymerisation step.

4. The process according to claim 1, wherein the secondary polymerisation loci are provided after at least 85% conversion of the vinyl monomers in the first polymerisation step.

5. The process according to claim 4, wherein the secondary polymerisation loci are micelles formed by adding surfactant in an amount above the critical micelle concentration and adding an initiator.

6. The process according to claim 1, wherein the secondary polymerisation loci are self precipitation of oligomers, formed upon theformed by addition of water soluble initiator and additional monomers, that have limited water solubility.

7. The process according to claim 6, wherein the monomer comprises styrene.

8. The process according to claim 1, wherein the total residual monomer content after the second polymerisation step is below 1.0 wt. %.

9. The process according to claim 1, wherein the auto-oxidative drying polymer is an alkyd having unsaturated fatty acids.

10. The process according to claim 1, wherein in the second polymerisation step additional vinyl monomer is added.

11. The process according to claim 1, wherein the total amount of vinyl polymer formed in the secondary nucleation loci is less than 20 wt % (relative to the total weight of vinyl monomers).

12. An aqueous hybrid polymer dispersion obtained by the process according to claim 1, comprising a hybrid polymer of an auto-oxidatively crosslinkable polymer and an addition polymer, wherein in a first polymerization step a first hybrid polymer dispersion is formed by addition polymerization of vinyl monomers in the presence of dispersed auto-oxidatively crosslinkable polymer, wherein, in a second polymerization step secondary polymerization loci are provided in the first hybrid polymer dispersion to polymerise residual vinyl monomer of the first polymerisation step; wherein the secondary polymerisation loci are provided after at least 75% conversion of the vinyl monomers in the first polymerisation step; and
wherein the dispersion comprises two different populations of particles wherein a first population of particles comprises a hybrid polymer comprising the auto-oxidatively crosslinkable polymer and the first addition polymer and a second population of particles comprises the second addition polymer.

13. The aqueous hybrid polymer dispersion according to claim 12, which dispersion has a residual monomer concentration below 1.0 wt %.

14. The aqueous hybrid polymer dispersion according to claim 12, wherein the dispersion is used in the manufacture of coating compositions, ink compositions or adhesives.

15. A coating composition comprising a binder material and coating additives, wherein the binder material is the aqueous hybrid polymer dispersion according to claim 12.

16. The composition according to claim 12, wherein the first polymerization step comprises the steps of:
  a. providing a mixture of
    i. an aqueous dispersion of 10 to 90 wt % of an auto-oxidatively crosslinkable polymer(wt % relative to total polymer weight)
    ii. 90 to 10 wt % vinyl monomers
    iii. 1 to 15 wt % surfactant(relative to total polymer and surfactant weight)
  b. converting the mixture to a mini-emulsion,
  c. adding a radical initiator to the mixture of step a or before, during or after step b,
  d. polymerising the vinyl polymers to form a first hybrid polymer dispersion preferably until reaching the limiting conversion;

and the second addition polymerization step comprises the steps of
  e. providing secondary polymerization loci in the first hybrid polymer dispersion,
  f. polymerise residual vinyl monomer of the first polymerisation step.

17. The composition to claim 12, wherein the secondary polymerisation loci are provided after at least 85% conversion of the vinyl monomers in the first polymerisation step and wherein the secondary polymerisation loci are micelles formed by adding surfactant in an amount above the critical micelle concentration and adding an initiator.

18. The composition according to claim 12, wherein the secondary polymerisation loci are formed by self precipitation of oligomers, formed upon the addition of water soluble initiator and additional monomers, that have limited water solubility.

* * * * *